(12) United States Patent
Penna et al.

(10) Patent No.: US 10,078,792 B2
(45) Date of Patent: Sep. 18, 2018

(54) METHOD FOR AUTOMATICALLY ASSESSING THE QUALITY OF A DISPENSED BEVERAGE

(71) Applicant: Gruppo Cimbali S.p.A., Binasco (IT)

(72) Inventors: Salvatore Penna, Turin (IT); Antony Vitillo, Turin (IT); Claudio Volonté, Binasco (IT); Nicholas Comotti, Capriate San Gervasio (IT)

(73) Assignee: Gruppo Cimbali S.p.a., Binasco (MI) (IT)

( * ) Notice: Subject to any disclaimer, the term of this patent is extended or adjusted under 35 U.S.C. 154(b) by 0 days.

(21) Appl. No.: 15/456,220

(22) Filed: Mar. 10, 2017

(65) Prior Publication Data

US 2017/0262729 A1    Sep. 14, 2017

(30) Foreign Application Priority Data

Mar. 11, 2016   (IT) .................. 102016000025716

(51) Int. Cl.
*G06K 9/00*   (2006.01)
*G06K 9/46*   (2006.01)
(Continued)

(52) U.S. Cl.
CPC ........ *G06K 9/4604* (2013.01); *A47J 31/4485* (2013.01); *A47J 43/12* (2013.01); *G06T 7/40* (2013.01); *H04L 67/06* (2013.01); *G06K 2209/17* (2013.01); *H04L 67/42* (2013.01); *H04M 1/72527* (2013.01)

(58) Field of Classification Search
CPC ....... A47J 31/4485; A47J 43/12; H04L 67/06; H04L 67/42; G06K 9/4604; G06K 2209/17; H04M 1/72527; G06T 7/40
See application file for complete search history.

(56) References Cited

U.S. PATENT DOCUMENTS 5,414,778 A * 5/1995 Schwartz ............. B67D 1/1247
                                                250/223 B
6,252,980 B1 * 6/2001 Schwartz ............. B67D 1/1247
                                                356/427
(Continued)

FOREIGN PATENT DOCUMENTS

DE    4445436    *  6/1996  ............. A47J 31/44
DE    4445436 A1    6/1996

OTHER PUBLICATIONS

Suzuki, S. et al., "Topological Structural Analysis of Digitized Binary Images by Border Following," Computer Vision, Graphics, and Image Processing 30:32-46, 1985.
(Continued)

*Primary Examiner* — Amara Abdi
(74) *Attorney, Agent, or Firm* — Seed IP Law Group LLP

(57) ABSTRACT

A method automatically evaluates the quality of milk foam dispensed by a machine for dispensing milk-based beverages through the analysis of an image of the free surface of the frothed milk contained in a container, wherein the analysis uses automatic procedures for processing images for identifying and quantifying, in the processed image, a physical characteristic representative of the texture of the surface of the frothed milk and hence indicative of the quality of milk foam, the physical characteristic being the plurality of air bubbles.

19 Claims, 9 Drawing Sheets

(51) Int. Cl.
*A47J 31/44* (2006.01)
*G06T 7/40* (2017.01)
*H04L 29/08* (2006.01)
*A47J 43/12* (2006.01)
*H04L 29/06* (2006.01)
*H04M 1/725* (2006.01)

(56) References Cited

U.S. PATENT DOCUMENTS

| | | |
|---|---|---|
| 6,901,848 B2 | 6/2005 | Beretta |
| 8,800,432 B2 | 8/2014 | Erba et al. |
| 2006/0210139 A1* | 9/2006 | Carroll .................. G01N 13/02 382/141 |
| 2008/0037876 A1 | 2/2008 | Galperin |
| 2008/0213453 A1* | 9/2008 | Burmester ........... A23C 9/1524 426/565 |
| 2009/0095163 A1* | 4/2009 | Sala ...................... A47J 31/402 99/284 |
| 2010/0075007 A1 | 3/2010 | Schindler et al. |
| 2015/0104546 A1 | 4/2015 | Mintus et al. |

OTHER PUBLICATIONS

Fitzgibbon, A. W. et al., "A Buyer's Guide to Conic Fitting," Proceedings of the 6$^{th}$ British Conference on Machine Vision, BMVC '95, vol. 2, pp. 513-522, 1995.

* cited by examiner

|  | Class Q | | | | | | |
|---|---|---|---|---|---|---|---|
| Pump power (PWM) | 6 | 5 | 4 | 3 | 2 | 1 | |
| 95 |  | 2<br>53 | 2.5<br>57 | 3<br>60 | 3.25<br>61 | 3.5<br>62 | S T |
| 90 | 1.5<br>51.7 | 2.25<br>56.7 | 2.5<br>56.4 | 3<br>60 | 3.25<br>65 | 3.5<br>66.6 | S T |
| 85 | 1.5<br>53.5 | 2<br>56.8 | 2.5<br>60 | 2.75<br>60.7 | 3<br>66.2 | 3.5<br>73 | S T |
| 80 | 1.5<br>56 | 2<br>58.2 | 2.5<br>63.7 | 2.75<br>64 | 3<br>67.8 | 3.5<br>74.6 | S T |
| 75 | 1.25<br>53.7 | 1.5<br>53.5 | 2.5<br>65 | 2.75<br>66.6 | 3.1<br>74 | 3.5<br>76.6 | S T |
| 70 | 1.5<br>58 | 2<br>61.2 | 2.35<br>65 | 2.5<br>67.8 | 2.85<br>71.4 | 3.1<br>77 | S T |
| 65 | 1.25<br>51.7 | 1.5<br>62.5 | 2.35<br>67.2 | 2.5<br>72.7 | 2.85<br>76 | 3<br>74.5 | S T |
| 60 | 1.25<br>60 | 1.5<br>63 | 2<br>70.5 | 2.35<br>72.7 | 2.5<br>78.2 | 2.85<br>80 | S T |
| 55 | 1.25<br>65.2 | 1.5<br>69.7 | 1.75<br>73.2 | 2<br>78.3 | 2.5<br>76.8 | 2.5<br>81.6 | S T |

Fig. 9

METHOD FOR AUTOMATICALLY ASSESSING THE QUALITY OF A DISPENSED BEVERAGE

BACKGROUND

Technical Field

The present disclosure relates to a method for the automatic diagnosis of the quality of milk foam, dispensed by a dispensing machine of milk-based hot and cold beverages. In particular and according to some preferred embodiments, the present disclosure regards a method for automatically evaluating the quality of milk foam dispensed by a frothed milk dispensing machine and for taking corrective actions. According to some embodiments, the present disclosure regards a method for the remote diagnosis of the quality of milk foam and for taking corrective actions.

Description of the Related Art

In the field of machines for preparing and dispensing coffee-based beverages, systems are generally known for the remote control of dispensing of a beverage from a machine. For example, it is possible to program the dispensing of a coffee of the desired type (cappuccino, espresso, macchiato) from a smartphone provided with a dedicated application and which communicates with a dispensing machine that includes Wi-Fi connection device.

EP2314188 describes an apparatus for refilling the filter-holders of an espresso coffee machine with selected doses of ground coffee which comprises a coffee machine that comprises at least one dispensing device and at least one grinder-meterer, wherein the machine comprises an identification unit which generates the information on the type of dose with which the filter-holder of the dispensing device must be refilled and the grinder-meterer comprises a detection unit for the information generated by the identification unit, wherein the detection unit causes the corresponding dose to be supplied to the filter-holder when the latter is positioned and retained on the grinder-meterer.

In the field of the automatic machines for the preparation of frothed milk, solutions have been developed that are set to attain a quality foam analogous to that obtained by an expert barman. The patent application EP1501398 describes a device for heating and frothing milk, with control of the temperature and foam quantity, in which pressurized air coming from a pump and vapor are introduced in a conveyor conduit immersible in a recipient containing milk.

Recently, there has been increased interest in beverages with cold frothed milk base. The patent application US 2010/0075007 describes a method for producing cold or hot milk foam, in which a mixture of milk and air is suctioned by means of a pump and selectively conveyed, through a throttle point, directly or through a flow heater.

A milk foam quality that satisfies the most demanding consumers is generally attributed with a very fine texture, which usually involves a creamy consistency and persistence. A visual inspection of the free surface of the beverage, and in particular of the frothed milk, provides indications regarding the quality of the foam. Nevertheless, a visual inspection often offers a result that is subjective, since it depends on the operator who executes the inspection and on the variability of his/her judgment, often influenced both by environmental factors and on his/her psycho-physical conditions. In order to seek to remedy the intrinsic subjectivity of an evaluation provided by a single operator, the sensory analysis is often carried out by a tasting group (panel), formed by "experts" of the field so as to "average out" the single evaluations.

BRIEF SUMMARY

The Applicant has observed that a more objective evaluation of the quality of milk foam, e.g. of the quality of a cappuccino or of a 'latte macchiato', would be advantageous in terms of time and result repeatability, resulting less expensive and more reliable.

The Applicant has understood that it is possible to automatically control the quality of milk foam dispensed by a machine for dispensing milk-based beverages through the analysis of an image of the free surface of the frothed milk contained in a container, wherein the analysis uses automatic procedures of image processing for identifying and quantifying, in the processed image, a physical characteristic representative of the texture of the surface of the frothed milk and hence indicative of the quality of milk foam.

In the preferred embodiments, the physical characteristic is an air bubble present on the surface of the frothed milk and the image processing is for identifying and numerically defining a plurality of air bubbles present on the surface of the frothed milk. The plurality of bubbles is numerically defined by a plurality of numerical parameters. The plurality of numerical parameters comprises the size of each bubble of the plurality of bubbles (e.g. average radius, in the case of description with ellipses, or radius, in the case of circles) and the number of the plurality of bubbles.

The present disclosure provides for a method of automatically assessing the quality of frothed milk foam in a milk-based beverage prepared by a dispensing machine, the method comprising:

providing a beverage containing frothed milk within a container, the beverage having a free surface of frothed milk having a surface texture;

defining a plurality of reference classes representative of a foam quality level based on a surface texture of the frothed milk on the free surface, wherein the surface texture is described by air bubbles on the free surface, said classes being characterized by a plurality of numerical parameters comprising size and number of the plurality of bubbles, and wherein each reference class is described by a respective plurality of numerical ranges of the plurality of numerical parameters, a numerical range corresponding to a respective numerical parameter of the plurality of numerical parameters for each reference class, whereby each reference class is defined by a respective plurality of numerical ranges of the plurality of numerical parameters;

acquiring a digital image of the free surface of the beverage as a primary image;

digitally processing the acquired primary image to obtain a processed image of the free surface of the frothed milk, wherein a plurality of bubbles representative of the surface texture is identified in the processed image, each bubble being defined by a contour line that defines its size;

in the processed image, calculating a plurality of values of the corresponding plurality of numerical parameters which characterize the plurality of bubbles that have been identified in the processed image;

checking the membership of each numerical parameter value that has been calculated in the processed image to the plurality of numerical ranges of said numerical parameter, the numerical ranges being associated with their respective reference classes, and according to the result of the step of checking, assigning a current reference class of the plurality of reference classes, to thereby assign a reference class of foam quality to the acquired image of the beverage containing frothed milk.

In some preferred embodiments, the Applicant has considered an automatic machine for preparing and dispensing frothed milk in which cold milk is suctioned by a pump for milk and is mixed with air so as to produce a milk-air mixture dispensed from a dispensing outlet. The air generally comes from the outside environment through an air conduit connected to the milk suction conduit, and the adjustment of the incoming air flow rate and hence of the quantity of air introduced during the dispensing of a beverage is attained by means of a flow calibrator, which can be manually controlled or controlled by a control unit for the electronic control of the incoming air flow rate. Alternatively, compressed air can be thrust by an air pump into a conduit in which the milk flows or into a milk and air mixing device, for example of the type described in DE4445436.

Typically, an automatic machine for the dispensing of frothed milk is installed with specific operating parameters relative to the preparation of the frothed milk, in particular operating parameters of circuit elements relevant for the operation of dispensing frothed milk, among which, for example the delivery flow rate of the pump for the milk and the calibration of the air flow rate entering the suction conduit. For example, if the milk suction pump is a variable flow pump, one or more flow rate values are often set at the time of the installation of the machine. The Applicant has observed that, during the use of the machine, some use conditions can vary and it is possible that the parameters set at the time of installation do not achieve the desired foam quality result. In some cases, it is also possible that the user of the automatic machine for the dispensing of frothed milk wishes to know if the quality of the foam can be (further) improved and in what manner.

The Applicant has understood that an automatic evaluation of the quality of the frothed milk followed, if necessary, by instructions regarding a corrective action, can be advantageous in terms of service/assistance costs or times.

In some embodiments, the method for the automatic diagnosis of the milk quality is achieved remotely.

In accordance with some embodiments of the present disclosure, a method is provided for automatically evaluating the quality of milk foam dispensed by a frothed milk dispensing machine, the method comprising:

providing an automatic machine for dispensing frothed milk from a dispensing outlet, which comprises a milk circuit comprising a plurality of circuit elements for which a respective plurality of machine operating parameters are set as current operating parameters, the plurality of machine operating parameters comprising a first machine operating parameter of a first circuit element;

dispensing, from the dispensing outlet, a frothed milk—based beverage, the beverage having a free surface of frothed milk having a surface texture, in which the dispensing is achieved with the current machine operating parameters;

defining a plurality of reference classes representative of a foam quality level based on the surface texture of the frothed milk, wherein the surface texture is described by air bubbles present on the free surface and characterized by a plurality of numerical parameters which comprises the size and the number of the plurality of bubbles on the free surface and wherein each reference class is represented by a reference class value and is described by a respective plurality of numerical ranges of the plurality of numerical parameters, a numerical parameter of the plurality of numerical parameters corresponding to a respective numerical range for each reference class, such that each reference class is defined by a respective plurality of numerical ranges of the plurality of numerical parameters;

acquiring a digital image as primary image of the free surface of the beverage via a data terminal which comprises a camera and is connectable to a data communication network;

transmitting the acquired digital image to a computing device through the data communication network;

creating, on the computing device, a database which comprises at least one data table which comprises, as entries, a plurality of values of the first machine operating parameter, each value of the first machine operating parameter being associated with a respective reference class value;

digitally processing the acquired primary image on the computing device, so as to obtain a processed image, in which a plurality of bubbles representative of the surface texture of the beverage is identified, each bubble being defined by a contour line that defines its size;

in the processed image, calculating a plurality of values of the corresponding plurality of numerical parameters characterizing the plurality of bubbles;

checking the membership of each numerical parameter value calculated in the processed image to the plurality of numerical ranges of said numerical parameter associated with the reference classes, and according to the result of the step of checking, assigning a current reference class represented by a reference class value $Q_k$ of the plurality of reference class values so as to assign a reference class of the quality of the foam to the acquired image of the beverage containing frothed milk.

In some preferred embodiments, the method is also for taking corrective actions and comprises, after assigning a current reference class:

retrieving a reference nominal class value Qn of the plurality of reference class values and checking whether the value $Q_k$ differs from the value Qn by a value greater than a predetermined threshold value;

if the value $Q_k$ differs from the nominal class value Qn by a value greater than the predetermined threshold value, retrieving a first value of first machine operating parameter associated with the nominal class Qn and a second value of first operating parameter associated with the current reference class value $Q_k$ from the database;

checking whether the first value of the machine operating parameter associated with the current reference class differs from the second value of first machine operating parameter, and if it does, outputting corrective action instruction data for adjusting the first current machine operating parameter according to the difference between the first and the second values of first machine operating parameter.

In some embodiments, the computing device is a remote computing device, preferably a remote server.

In one embodiment, the computing device is installed in a dispensing machine which comprises a module for transmitting and receiving network data, the module being connectable with the data communication network.

Preferably, the acquired primary image is a photographic image.

BRIEF DESCRIPTION OF THE SEVERAL VIEWS OF THE DRAWINGS

Further characteristics and advantages of the disclosure will be clear from the following detailed description made with reference to embodiments of the disclosure given as non-limiting examples and to the enclosed figures in which:

FIG. 9 shows an example of a data table relative to machine operating parameters associated with a plurality of class values Q from 1 to 6.

DETAILED DESCRIPTION

The primary image of the free surface of the frothed milk-based beverage is, in the preferred embodiments, a photograph of the surface of the dispensed beverage in a container. FIGS. 1(a)-(g) each report a photograph taken of the surface of the milk in a cappuccino dispensed in a cup, in which the milk foam visibly has different characteristics ranging from a liquid milk with little frothing of FIG. 1(a) to a foam with very fine and lasting texture of FIG. 1(g), the quality of the foam gradually improving from FIG. 1(a) to FIG. 1(g). From the quality standpoint, the quality of the foam can be described by attributes such as texture, consistency, persistence, and some of these attributes can be perceived by the naked eye. In the embodiment shown in FIGS. 1(a)-1(g), seven foam quality levels are provided with can be described in the following manner, with regard to quality:

FIG. 1(a): foam nearly non-existent, liquid visible beneath the bubbles;

FIG. 1(b): light foam with little consistency, with presence of large bubbles that are progressively burst;

FIG. 1(c): foam with large and medium size bubbles;

FIG. 1(d): foam marked by a significant presence of more or less large bubbles;

FIG. 1(e): fine foam with some large bubbles;

FIG. 1(f): fine texture but micro-bubbles still visible; and

FIG. 1(g): very fine texture, practically invisible.

The Applicant has observed that it is possible to categorize a plurality of sample images in a plurality of reference classes representative of the quality level of the milk foam and defined on the basis of the surface texture of the frothed milk.

More generally, it is possible to define a plurality of reference classes representative of a foam quality level, the reference classes being indicated with a respective plurality of class values $Q_k$, k=1, ..., r, comprised between a minimum value, $Q_{min}$, and a maximum value of reference nominal class, $Q_{max}$, the quality of the foam gradually improving from $Q_{min}$ to $Q_{max}$, in which each reference class is described by a plurality of numerical ranges of a corresponding plurality of reference parameters of the physical characteristic of surface texture, i.e. one or more air bubbles. The numerical value ranges quantitatively define the classes. Even if the embodiment of FIGS. 1(a) to 1(g) shows seven sample images, it is intended that the number of the reference classes is merely exemplifying, along with the numerical values assigned to the different reference classes in the embodiments reported hereinbelow.

Figure 2:
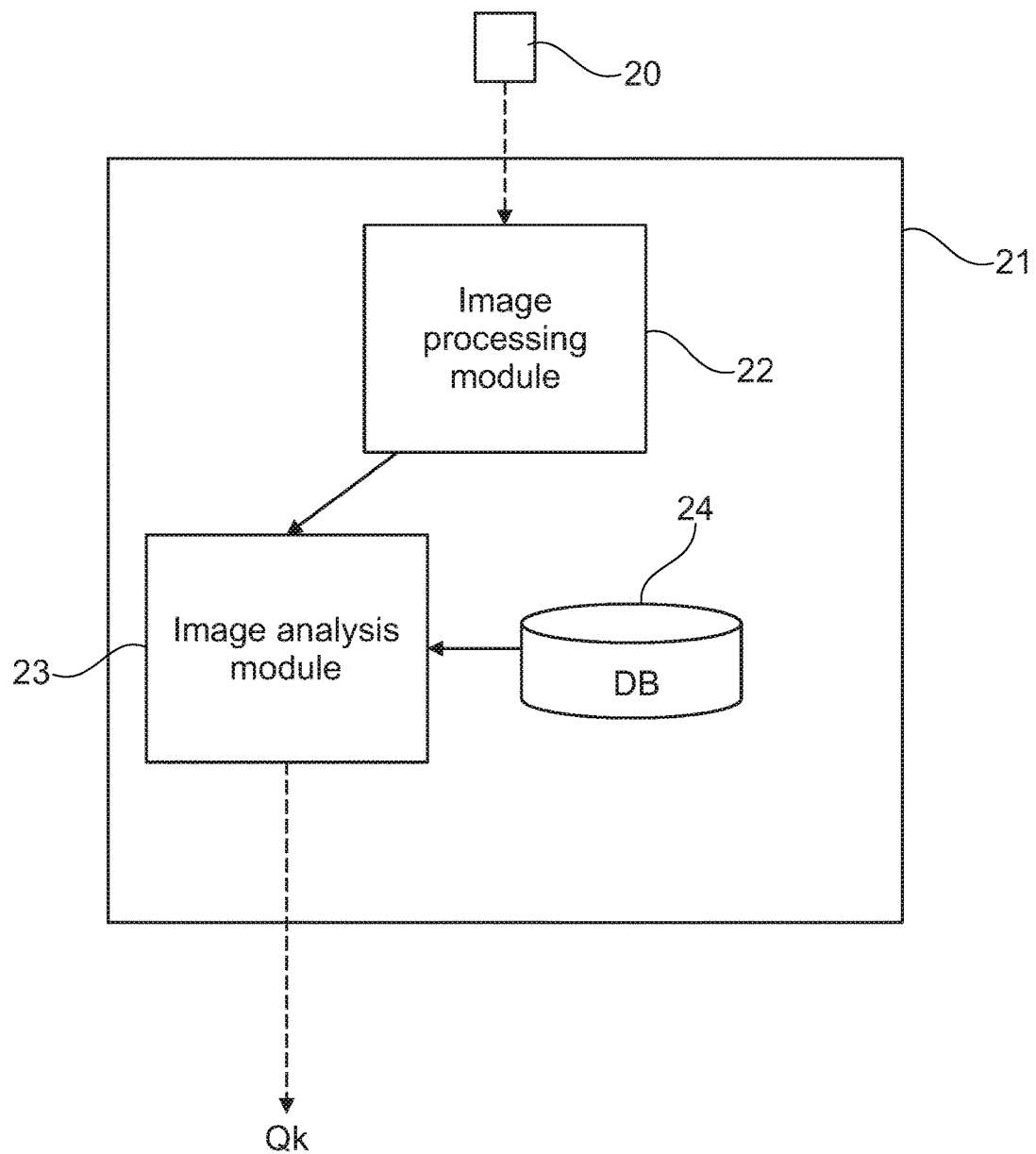
FIG. 2 is a block diagram which represents the high level architecture of an electronic processing system of the information for automatically diagnosing the quality of milk foam dispensed by an automatic machine for frothed milk preparation, in accordance with an embodiment of the present disclosure.

FIG. 2 is a block diagram that represents the high level architecture of a data electronic processing system for automatically diagnosing the quality of milk foam dispensed by a machine for preparing and dispensing frothed milk, in accordance with one embodiment of the present disclosure. A primary digital image 20 of the free surface of a frothed milk—based beverage dispensed by the machine in a container is acquired by a data processing system 21 for the diagnosis of the milk foam. The free surface of the beverage is delimited by the edges of the container, for example by the edges of a cappuccino cup. The system 21 comprises an image processing module 22 configured for receiving and processing the primary image so as to produce a processed image in which a physical characteristic is identified, physical characteristic being representative of the surface texture. In accordance with the present disclosure, the physical characteristic is a plurality of air bubbles that emerge on the surface of the frothed milk.

In the embodiment of FIG. 2, the data processing system 21 for the diagnosis of the milk foam is installed in a server that is remote with respect to the frothed milk dispensing machine and it is executed on the server. In a different embodiment, the data processing system 21 is installed and executed in a processor comprised in the dispensing machine.

The system 21 also comprises a module 23 for analyzing the processed image, logically connected to the image processing module 22, the image analysis module 23 being configured for receiving the processed image and for calculating, in the processed image, a plurality of parameters relative to the air bubbles.

The system 21 also comprises a database 24 in which a plurality of numerical ranges is stored for each numerical parameter of the plurality of numerical parameters characterizing the air bubbles, each numerical range being associated with a respective reference class $Q_k$ of the plurality of reference classes indicative of the quality of the foam, such that each reference class is described by a plurality of numerical ranges corresponding to the plurality of reference parameters.

Preferably, the reference classes are represented by a numerical value, indicated with class value, e.g. a numerical integer value. The database 24 is preferably a data structure, e.g. a lookup table formed by vectors, associated with a reference class and described by a plurality of numerical ranges associated with respective numerical parameters of the plurality of bubbles. The image analysis module 23 is logically connected to the database 24 and is configured to associate each numerical parameter of the plurality of numerical parameters calculated for the plurality of bubbles identified in the processed image with a numerical range of the corresponding reference parameters stored in the database 24, so as to determine the reference class of such calculated numerical parameter. The image analysis module 23 is also configured to, after determining the reference class of each calculated numerical parameter, calculating the reference class $Q_k$ on the basis of the one or more reference classes associated with the numerical parameters, as described in more detail hereinbelow.

Following the determination of the value of the reference class, $Q_k$, of the plurality of reference classes $Q_1, Q_2, \ldots, Q_r$, derived from the analysis of the processed image, the image analysis module 23 is configured for outputting information data indicative of the reference class as result of the processing of the primary image and of the analysis of the processed image.

In one embodiment, in which the system 21 is installed in a dispensing machine provided with a user interface and a display, the image analysis module 23 is configured for communicating with a user interface of the machine for display of the value $Q_k$ on the display, which then becomes information usable by the user.

In another embodiment, in which the system 21 is installed in a server that is remote with respect to the dispensing machine, the image analysis module is configured for communicating with a transmission module for the transmission of the value $Q_k$ to a data terminal connected to the server through a data communication network or to a control unit of the dispensing machine, if the machine is provided with a data transceiver module, for display of the value $Q_k$. In this manner, a user receives the information regarding the reference class that corresponds to the milk frothing in the dispensed beverage, which is in the primary image sent to the data processing system 21.

Figure 3:
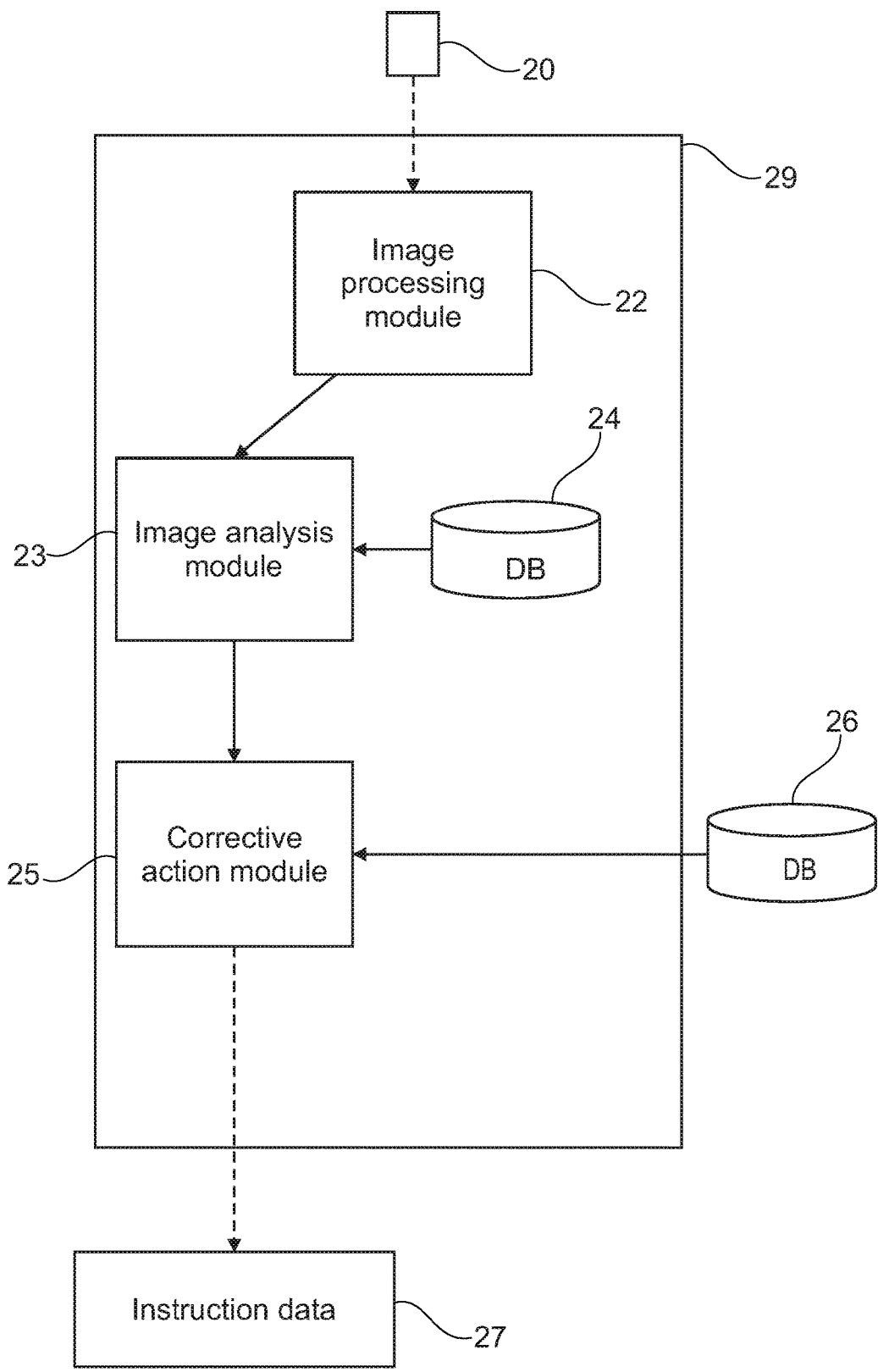
FIG. 3 is a block diagram which represents the high level architecture of an electronic processing system of the information for automatically diagnosing the quality of milk foam dispensed by an automatic machine for frothed milk preparation, in accordance with a further embodiment of the present disclosure.

FIG. 3 is a block diagram which represents the high level architecture of a data electronic processing system for automatically diagnosing the quality of milk foam dispensed by a machine for preparing and dispensing frothed milk, in accordance with a further embodiment of the present disclosure. Elements having functions similar to those described with reference to FIG. 2 bear the same numerical references. In the embodiment of FIG. 3, a primary image 20 is acquired by a data processing system 29 which comprises a corrective action module 25 logically connected to the image analysis modules 23. The image analysis module is configured for transmitting the value $Q_k$ to the corrective action module 25. The module 25 is also configured for retrieving a nominal class value, Qn, comprised in the plurality of reference class values (i.e. n comprised between 1 and r), and comparing the reference class value $Q_k$ with Qn in order to determine if the reference class value differs from the nominal class value by a value greater than a predetermined threshold value. If it does, the corrective action module 25 is configured for retrieving a value of a machine operating parameter associated with the reference class $Q_k$ and a nominal value of the machine operating parameter, associated with the nominal class Qn, and for outputting instruction data 27 for adjusting the machine current operating parameter according to the difference between the value of the machine operating parameter associated with the class $Q_k$ and the value of the machine operating parameter associated with the class Qn.

Preferably, the operating parameters associated with the reference classes are structured in a database 26, which comprises at least one data table in which a vector of values of the machine operating parameters is associated with each reference class of the plurality of reference classes. The database 26 is preferably comprised in the data processing system 21.

In one embodiment, the instruction data 27 is selected from a plurality of instruction data that is pre-programmed and stored in the system 29 such to be accessible to the corrective action module.

In one embodiment, in which the frothed milk dispensing machine is provided with a module for transmitting and receiving network data connectable with a data communication network and is provided with a control unit connected with the data transceiver module and with circuit elements relevant for the dispensing of the frothed milk for controlling the machine operating parameters of the circuit elements, outputting instruction data comprises transmitting the instruction data to the control unit of the dispensing machine and executing the instruction data by automatically adjusting at least one machine operating parameter relative to a circuit element.

In a further embodiment, the result of the processing executed by the corrective action module 25 comprises transmitting instruction data 27, automatically rendered to the user by displaying a message on the display of a data terminal or on the display of the dispensing machine, if the data terminal or the control unit of the dispensing machine is connected to the processing system 29 by means of a data communication network.

If the result of the corrective action is the display of a message, the instruction data is, in accordance with one embodiment, in the form of a pre-programmed written message, for example "Change the power of the pump to 30% PWM", in which the value "30%" is retrieved from the database 26 as value of the operating parameter pump power, associated with the reference nominal class Qn.

The nominal class value, Qn, for example corresponds to the maximum quality of milk foam obtainable from the dispensing machine.

In a network-connected environment, the data processing system for automatically diagnosing the quality of milk foam is realized as a software that provides high level application programs. The modules of the data processing system for the diagnosis of the quality of the foam are software components provided by high level application programs that include database applications, mathematical algorithms, and software infrastructures that connect the various software components.

In accordance with the preferred embodiments, a digital image of the free surface of the frothed milk—based beverage is acquired via a data terminal which comprises a camera and can be connected to a mobile data communication network mobile or to a fixed line data network. In one embodiment, the data terminal is a smartphone or a tablet provided with a camera and connectable to a mobile data network, e.g. UMTS, EDGE or GPRS. As is generally known, if the data terminal is provided with a WiFi function, the connection to a data network is possible through a local network by means of wireless signals (WLAN). Typically, the data terminals equipped with a camera comprise a memory on which it is possible to store a photograph captured with the terminal.

In the present context and in a more general form, with data terminal provided with camera it is meant a device which comprises a data transceiver module and a camera.

In the preferred embodiments, the data terminal is provided with an application software for managing the interaction between the data terminal and a remote server. Preferably, the application software is a program that is connected via a Web API to a remote end-point that carries out the required image analysis function and returns the result.

Figure 4:
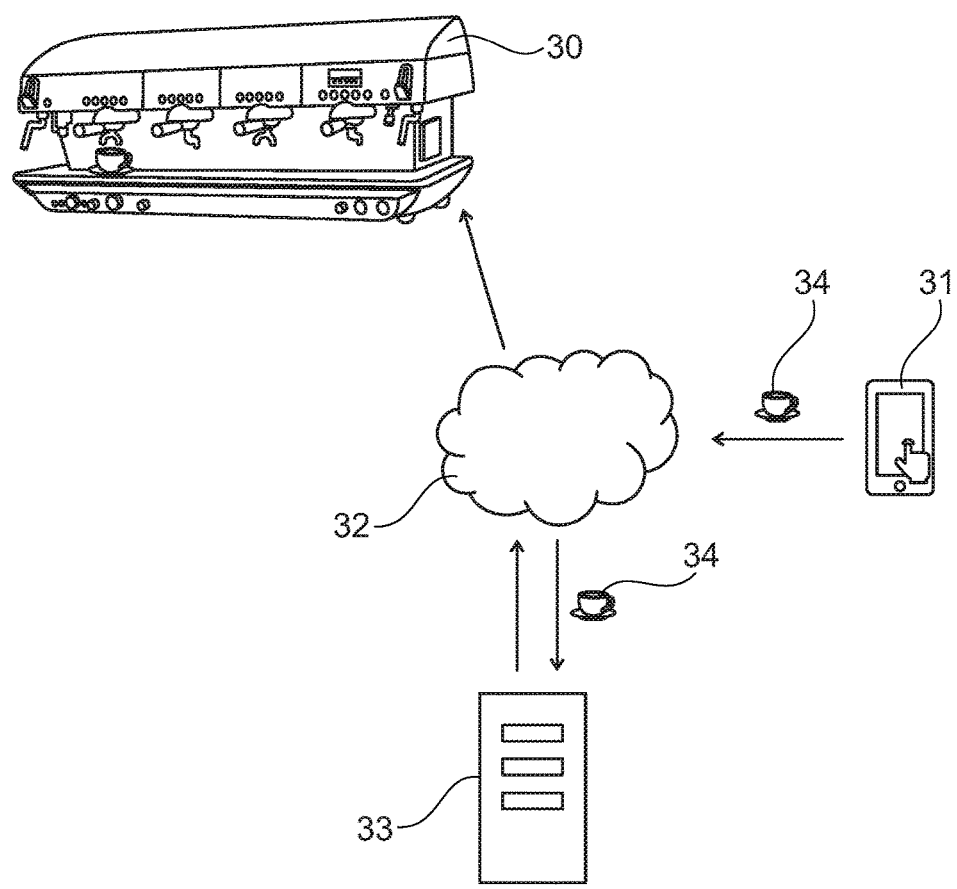
FIG. 4 is a block diagram which illustrates a network environment that includes a data processing system for the diagnosis of the milk foam, in accordance with one embodiment of the present disclosure.

FIG. 4 is a block diagram that illustrates a network environment that includes a data processing system for the diagnosis of the milk foam, in accordance with one embodiment of the present disclosure. A machine 30 for the automatic dispensing of frothed milk is provided for, which comprises an electronic control unit for the control of the circuit elements relevant for the operation of dispensing the frothed milk (not visible in the figure). The dispensing machine is also provided with a data transceiver module for the connection with a fixed line or mobile data communication network, e.g. a Wi-Fi module for the connection to a local network in wireless mode, the local network being connected with the data communication network.

Through the electronic control unit, the dispensing of the frothed milk in a cup is controlled by a user, e.g. by means of a button or a touch-screen display connected with a user interface in turn connected to the electronic control unit of the machine. A data terminal 31 is provided that is equipped with a mobile operating system (e.g. Android, iOS or WindowsPhone) and with a digital camera. The terminal 31 is for example a smartphone or a tablet. On the data terminal, an application software is installed and running that is configured for accessing a remote server 33 which has installed the application software of a data processing system for the diagnosis of the quality of milk foam, e.g. of the type described with reference to FIG. 2 or FIG. 3. In the usual ways, the application installed in the terminal comprises user interface elements for the initialization of the application itself, for the transmission of the data to the server-side application (e.g. transmission of a digital photograph), for the reception of data from the server 33 and for displaying received data on the terminal display.

In some embodiments, with the opening of the application by the user, such user is requested to insert technical information regarding the function of the dispensing machine as input data. The input data comprises machine operating parameters and in particular operating parameters of circuit elements relative to the dispensing of frothed milk, such as the operating power of the milk suction pump, expressed for example in a number of motor revolutions or in a percentage value of PWM signal to the pump, or the flow rate of air entering the milk flow, e.g. expressed through the flow cross-section of an air inlet valve. The input data can also comprise the model of the machine, registration or barcode number, or any other machine identification code.

In this operating mode of manual insertion of input data by the user, the application installed in the terminal is configured for transmitting the input data to the server. The input data relative to the operating parameters of the machine are preferably encoded in the software setting of the server in a data structure.

Following a dispensing of milk foam in a container, e.g. in a cup, by the machine 30, the user takes a photograph 34 of the free surface of the milk foam in the cup by means of the data terminal 31 and transmits the photograph 34 through a data communication network 32 to the remote server 33, by using the application. The remote server, upon reception of the photograph, initializes the diagnosis processing system in the server-side application (in per se known modes, for example by means of a script that invokes the application).

In one embodiment, the data terminal 31 comprises a digital camera configured for capturing the image with a resolution of at least 8 megapixels.

Preferably, with the opening of the application by the user, the application itself produces a query that requests the insertion of the nominal class value Qn associated with the quality of the foam considered optimal for the dispensing machine under examination or desired by the user. Preferably, the query also requests the insertion of the value of the diameter of the cup where the frothed milk must be dispensed or has been dispensed.

In per se known modes, with its opening, the application produces a template, comprising a query presented to the user through a user interface application. The input data is inserted by the user in usual ways, e.g. through the user interface application connected to the application through a display unit (e.g. a display) and an input unit (e.g. a keyboard, a touch display, etc.) of the data terminal.

Upon reception of the image transmitted by the data terminal, the server-side application is initialized and sequentially executes the digital processing of the received image in order to produce a processed image in which the physical characteristics representative of the surface texture of the foam (i.e. air bubbles) are identified, and the analysis of the processed image by calculating the numerical parameters that quantitatively define the plurality of bubbles identified in the processed image in order to determine which reference class $Q_k$ of the plurality of reference classes is associated with the dispensed beverage.

In an electronic data processing system for automatically diagnosing the quality of milk foam of the type described in FIG. 2, the determined value of the reference class, $Q_k$, is transmitted to the data terminal 31 for display of the value in the display of the same terminal. In one embodiment, the reference class $Q_k$ is transmitted to the control unit of the dispensing machine 30 for display of the class on the display of the machine. The user is then able to know the reference class to which the frothed milk—based beverage belongs and hence the quality of the foam dispensed by the machine.

In the preferred embodiments, the method and system for electronic data processing for automatically diagnosing the quality of milk foam provide for automatically checking if there is a difference $\Delta Q$, between the calculated reference class $Q_k$ and the nominal class Qn, $\Delta Q=(Qn-Q_k)\neq 0$, with absolute value greater than a predetermined threshold value and, if so, outputting corrective action instruction data for adjusting at least one machine operating parameter.

The control unit of the machine is configured in a manner such that, upon reception of the instruction data from the server 33, it executes an automatic adjustment of at least one machine operating parameter for the operation of dispensing frothed milk, e.g. the variation of the flow rate of air entering the milk flow or the variation of the output milk-air flow rate, e.g. by means of adjustment of a solenoid valve in an air conduit or of a compressed air pump.

Figure 1:
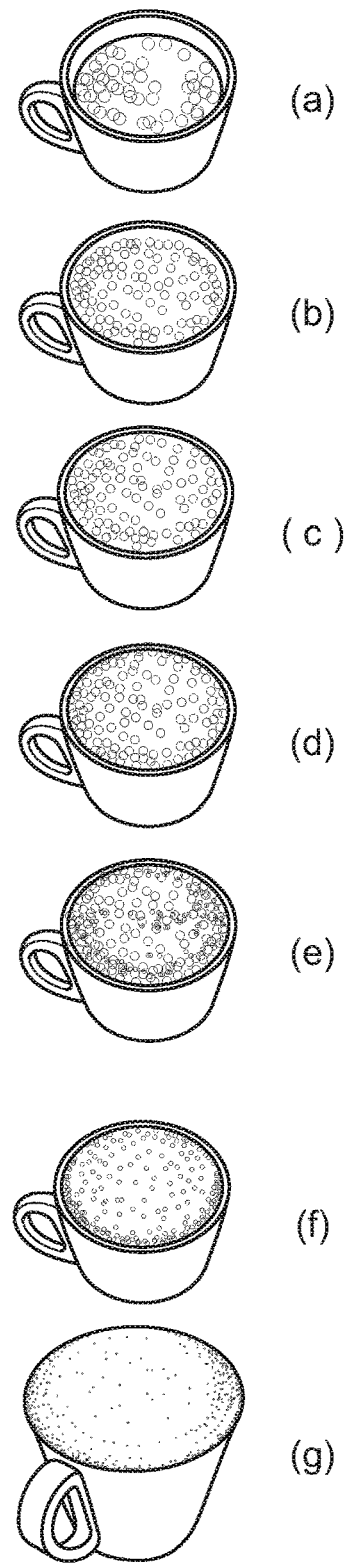
FIGS. 1(a)-(g) each report a photograph taken of the surface of the milk in a cappuccino dispensed in a cup, in which the milk foam visibly has different characteristics.

With reference to the embodiment of FIG. 1, integer values ranging from 1 to 7 can be associated with the respective reference classes. The nominal class value, corresponding to a "good" foam quality, is typically greater than or equal to 5. It is observed that the nominal class value is not necessarily Qn=7, since a dispensing machine can be created and configured (e.g. for executing laboratory tests) in a manner such to not obtain a high quality foam texture via the adjustment of circuit elements that come into contact with the air and/or with the milk and which are adjustable (not visible in the figure).

In some preferred embodiments, Qn represents the reference class with highest value (in the example of FIG. 1, $Qn=Q_{max}=7$).

In some preferred embodiments, upon reception of the image transmitted by the data terminal, the server-side application is initialized, and it sequentially executes the digital processing of the received image in order to show a plurality of bubbles on the surface of the frothed milk, the analysis of the processed image in order to determine a reference class value $Q_k$ associated with the numerical parameters relative to the plurality of bubbles identified in the processed image, and it checks whether a difference $\Delta Q=(Qn-Q_k)\neq 0$ is present with absolute value greater than a predetermined threshold value. If this is the case, the method comprises retrieving, from a data table preferably installed on a server, at least one respective operating parameter of the machine relative to Qn and $Q_k$ and outputting instruction data which comprise one of the following corrective actions:

automatically executing an adjustment of the at least one operating parameter of the machine 30, by transmitting electronic commands to the control unit connected to the one or more circuit elements relative to the frothed milk dispensing, and transmitting instruction data to the data terminal 31 in a form such to be displayed on the display of the terminal and hence usable by the user, who can subsequently impart commands to the machine for adjusting the at least one operating parameter.

The corrective actions can comprise a combination of the actions (i) and (ii).

In an embodiment not illustrated in FIG. 4, the machine 30 is provided with a camera and the application is installed in the electronic control unit of the machine which allows acquiring and transmitting the photograph to the server 33. In such embodiment, the use of a mobile data terminal mobile is not necessary, since the functions of the data terminal relevant for the method in accordance with the present disclosure are present in the machine.

In a further embodiment (not shown in FIG. 4), the automatic diagnosis system is on board the machine 30 (i.e. the machine comprises a computing device). In this case, outputting instruction data comprises transmitting the instruction data to the machine in a form such to be displayed on the display of the machine or automatically executing an adjustment of at least one operating parameter of the machine 30 by transmitting electronic commands to the control unit connected to one or more circuit elements relative to the frothed milk dispensing.

Figure 5:
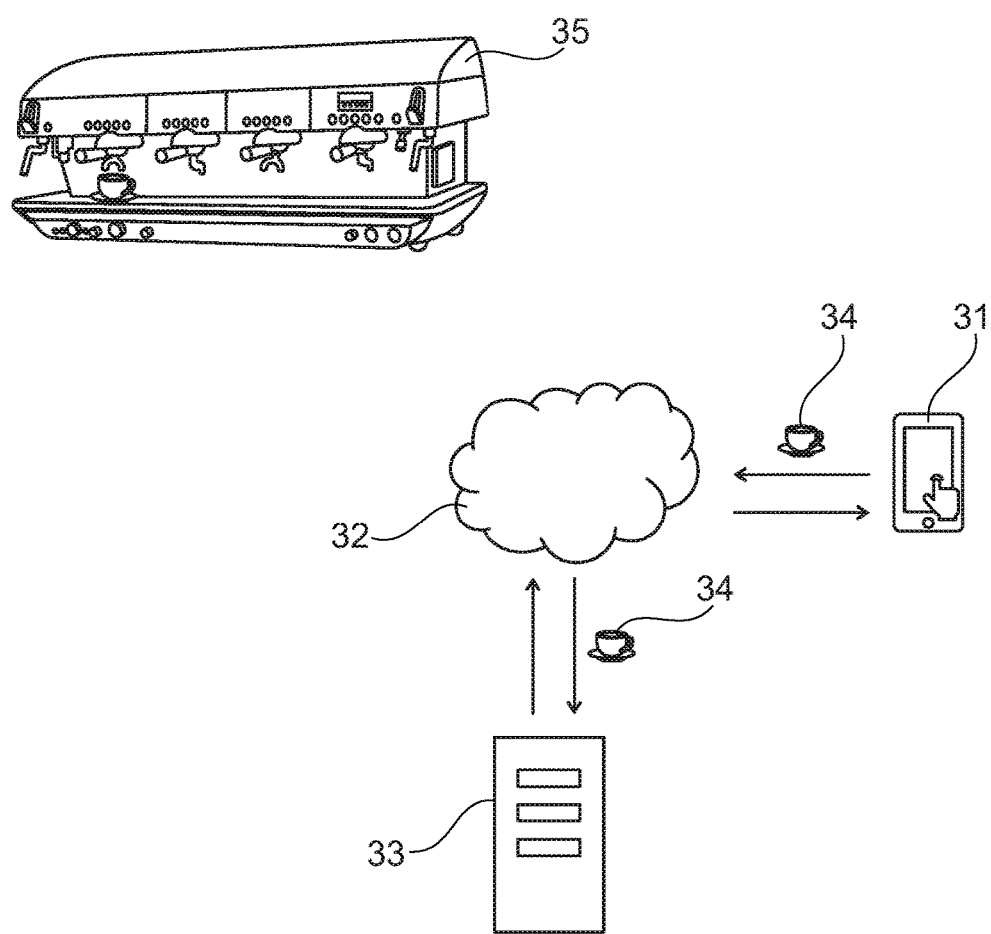
FIG. 5 is a block diagram which illustrates a network environment that includes a data processing system for the diagnosis of the milk foam, in accordance with a further embodiment of the present disclosure.

FIG. 5 is a block diagram that illustrates a network environment that includes an information processing system for the diagnosis of the milk foam, in accordance with a further embodiment of the present disclosure. Elements having functions similar to those described with reference to FIG. 4 bear the same reference numbers. In the present embodiment, a dispensing machine 35 is provided for automatic dispensing of frothed milk which comprises an electronic control unit (e.g. a central processing unit, CPU) for controlling the circuit elements relevant for the operation of dispensing the frothed milk (not visible in the figure). Through the electronic control unit, the dispensing of the frothed milk into a cup is controlled by a user, e.g. via a button or touch-screen display connected to a user interface in turn connected to the electronic control unit of the machine. The dispensing machine 35 is not provided with a data transceiver module connectable with a data communication network. Hence, the communication only occurs between the server 32 and the data terminal 31. The user initializes the application and manually inserts the machine operating parameters and the nominal class value, Qn. Following a dispensing of milk foam into a container, for example into a cup, by the machine 35, the user takes a photograph 34 of the free surface of the milk foam in the cup by means of the data terminal 31 and transmits the photograph 34 to the remote server 33 by using the client-side application. The remote server, upon reception of the photograph, initializes the diagnosis processing system for the foam and correction executed by the server-side application which in output gives the reference class $Q_k$ associated with the numerical parameters relative to the physical characteristic representative of the surface texture of the foam. The reference class is transmitted to the data terminal 31, for example by displaying a message on the display of a data terminal containing the numerical value of the class.

In one embodiment, the system checks if the value of the class $Q_k$ is different from the value of the nominal class Qn inserted as input data by the user and, if it is, the system transmits a message from the server to the user requesting if he/she wishes to proceed with a corrective action for the machine. If the user selects the option of proceeding with a corrective action, the method comprises retrieving, from a data table preferably installed on the server, a respective value of at least one operating parameter of the machine relative to Qn and to $Q_k$ and outputting instruction data comprises transmitting instruction data to the data terminal 31 in a form such to be displayed on the display of the terminal and hence usable by the user, who can subsequently impart commands to the machine for adjusting the at least one operating parameter.

The method in accordance with the present disclosure is preferably implemented on an automatic machine for dispensing frothed milk which comprises a pump for sucking in cold milk from a container along a milk suction conduit, in which the milk is mixed with air introduced into the milk flow, for example into the suction conduit, such to produce a milk-air mixture dispensed from a dispensing outlet. In one embodiment, the actuation of the pump and the flow rate of the air flow entering the milk flow are controlled by a control unit. In one embodiment, the pump has variable flow rate and the control unit is configured for controlling the pump output flow rate. Preferably the flow calibrator is a flow-control solenoid valve, in which the flow rate of air entering the air conduit is controlled by the control unit.

Figure 6:
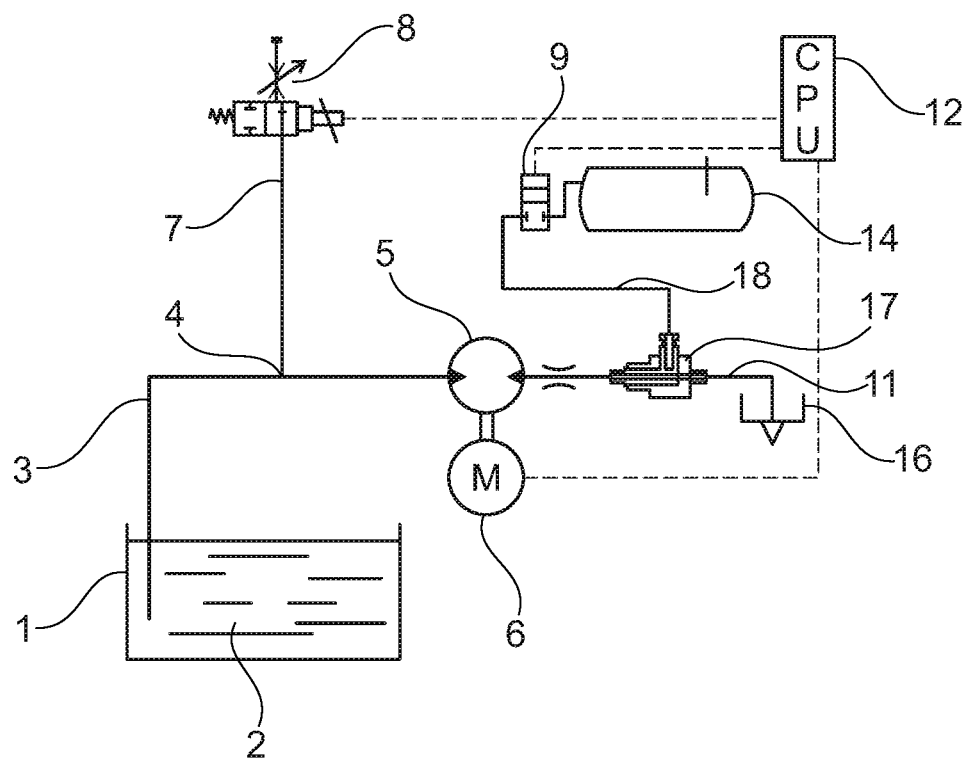
FIG. 6 shows a diagram of an apparatus for producing and dispensing cold and hot frothed milk, on which the method in accordance with an embodiment of the present disclosure can be implemented.

Without wishing to limit the present disclosure to a particular solution for heating milk (the machine could be configured for dispensing only cold frothed milk) or to a particular circuit for dispensing milk, FIG. 6 schematically shows an apparatus for producing and dispensing cold and hot frothed milk, on which the method can be implemented in accordance with one embodiment of the present disclosure. In FIG. 6, the diagram is illustrated of an apparatus for preparing and dispensing milk-based beverages, both cold and hot, with frothing or without frothing. In the preferred embodiments, the apparatus for dispensing cold or hot milk is part of a coffee machine, preferably an espresso coffee machine, which dispenses different beverages based on coffee, coffee and milk or just milk, e.g. cappuccino, latte macchiato, summer coffee with cold frothed milk, hot non-frothed milk etc.

Cold milk 2, preferably cooled to a temperature ranging from 3° C. to 5° C., is contained in a container 1. The cold milk 2 is suctioned from the container, by means of a pump 5 driven by a motor 6, along a suction conduit 3 having a first open end inserted in the container 1 and a second end connected to the pump. The pump can be for example a gear pump. Upstream of the pump, a first air conduit 7 is connected to the suction conduit 3 by means of a first connection point 4. The first air conduit has a free end for the ambient air inlet, and a solenoid valve 8 is arranged thereon with adjustable flow rate for adjusting the incoming air and hence the quantity of air introduced during the dispensing of a beverage. A variation of the incoming air flow allows varying the ratio between air and milk in the air/milk mixture sucked by the pump and generally modifies the frothing of the milk. The adjustment of the air flow rate via the solenoid valve 8 is preferably controlled by an electronic control unit (CPU) 12 which controls the incoming air flow rate by selecting a specific cross-section opening value, e.g. a specific value of the section transverse to the air flow that crosses the outlet opening. In one embodiment, the air flow-control valve 8 is a solenoid valve of proportional type in which the variable flow rate is proportional to the control signal. In a different embodiment, the valve 8 is a graduated calibrator which can be manually adjusted.

In FIG. 6, the control line that connects the CPU to the solenoid valve 8 and in general the control lines between the CPU and other electric or electronic devices of the apparatus are indicated with a dashed line.

Milk and air are mixed inside the pump 5 and delivered from the pump outlet into an outlet conduit 11 that terminates with a frothed milk dispensing outlet or end 16. The compressed mixture of milk and air is thrust along the outlet conduit 20 through a flow heater 17 arranged in the outlet conduit and configured for heating the milk during its passage to the interior of the heater. In an embodiment, shown in FIG. 6, the flow heater 17 is a vapor heater connected to a vapor generator 14 by means of a vapor conduit 18. The flow heater comprises a first inlet for introducing the milk/air mixture thrust by the pump delivery. The vapor conduit 18 introduces pressurized vapor in the flow heater 17 through a second inlet of the heater, which is arranged with respect to the first inlet in a manner such that the milk/air mixture and the vapor are separately fed along two directions which are intersected within the heater. In the vapor conduit 18, a solenoid valve for intercepting vapor 9 is inserted, in order to close and open said conduit and hence interrupt the vapor flow or make it arrive to the heater 17. The electronic control unit 12 controls the vapor valve 9 by actuating its opening and closing.

The pump 5 works in an operating condition, defined by at least one operating parameter, corresponding to a delivery flow rate of the air/milk mixture introduced into the outlet conduit 11. The CPU 12 controls the actuation of the pump by controlling the motor 6.

In some embodiments, the pump 5 is a variable flow pump, preferably with variable rotation speed. A variation of the delivery flow of the pump allows varying the ratio between air and milk in the air/milk mixture. In the case of variable flow pump, the CPU 12 controls the motor 6 of the pump 5 by controlling the rotation speed of the pump.

The cold or hot frothed milk exits from the dispensing outlet 16 positioned at the open end of the outlet conduit 11 and ends in a cup or glass 19. With reference to the non-limiting example for the preparation of a cappuccino, the coffee is typically dispensed from a separate dispensing outlet (not shown) into the cup and then the milk foam is dispensed from the milk dispensing outlet 16, which fills or nearly fills the cup.

In a different embodiment, not shown in the figure, downstream of the pump, on the outlet conduit, a diverter valve is arranged which selectively conveys the milk-air mixture directly to the dispensing outlet or through a flow heater. A circuit for dispensing milk of this type is described in US 2010/0075007.

After dispensing the cappuccino, the user initializes the application in the data terminal, takes a photograph and transmits the photographic image (primary image) of the cup filled with the cappuccino to the server which executes a digital image processing process of the received photographic image.

With the photographic image, the user inserts a calibration parameter, such as an inner diameter of the container, preferably a cappuccino cup. Once the inner diameter of the cup has been received as input data, the image processing process proceeds with the measurement of the cup inner diameter, in pixels, thus enabling a calibration of the images from image units (pixels) to metric units. Preferably, the user inserts current machine operating parameters (in use in the machine during the dispensing of the beverage whose photograph was acquired) which comprise at least one operating parameter of the pump, e.g. the operating power of the milk suction pump, expressed for example in number of revolutions of the motor or in a percentage value of PWM signal to the pump, if the pump is a pump with variable rotation speed, and the opening of the air flow regulation valve if the valve is a manually-adjustable flow calibrator, or the work voltage of the flow-regulator solenoid valve. Optionally, the user inserts, as input data, other machine operating parameters such as the temperature of the boiler or the vapor pressure and the model of the machine or another product identification code.

Figure 7:
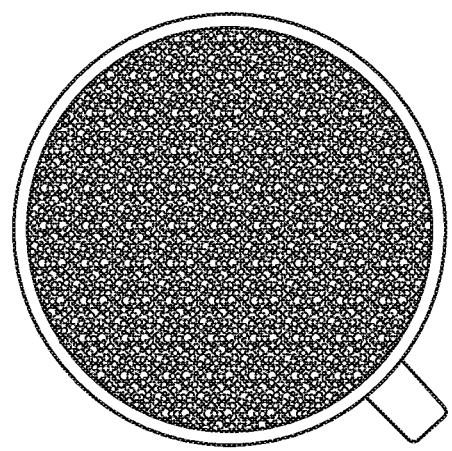
FIG. 7 shows an example of a primary image, received from the data terminal.

FIG. 7 shows an embodiment of a digital primary image (color photographic image), received from the data terminal. The primary image is a digital photograph of a top view of a cup with circular edge containing a cappuccino, whose upper surface is formed by frothed milk. In one embodiment, the process of digital image processing comprises the following sequential steps:

(a) receiving the primary digital image;

(b) receiving, as input data, the value of the external radius of the edge of the cup, in metric units;

(c) limiting the primary image by using one or more library functions (e.g. OPENCV), eliminating the region of the image outside the edge of the cup or covering the external region with a uniform color, e.g. black;

(d) measuring, in pixel units, the value of the external radius of the edge of the cup, so as to obtain a calibration for the conversion of elements of the image from pixel coordinates to metric units;

(e) converting the internal region limited by the edge of the cup of the image into a gray scale so as to create a mapping of the surface of the frothed milk in gray scale;

(f) applying a smoothing filter on the image and one or more sharpening filters, in order to remove the noise present in the primary image. For example, the smoothing filter is a Gaussian filter. For example, the sharpening filter is a Laplacian filter;

(g) converting the gray scale image obtained in step (f) into a binary image. For example, if in the gray scale image each pixel has an intensity value comprised between 0 and 255, the binarization of the image provides for converting into black all the pixels in which the value is less than 220 and into white all those whose value is greater than or equal to 220.

(h) applying, on the binary image, a digital filter for extracting the contours, in order to define the edges of the bubbles on the surface of the milk, obtaining as result a plurality of contours, one for each bubble shown by the digital processing of the preceding steps. The contour extraction algorithm is for example SUZUKI 85, described in "*Topological structural analysis of digitized binary images by border following*", by S. Suzuki and K. Abe, published in Computer Vision, Graphics, and Image Processing, 30(1):32-46 (1985). The extracted contour lines are spatially defined in the image in pixel coordinates, which are converted into metric units by means of the above-indicated calibration;

(i) transforming the plurality of the contour lines of the bubbles identified in the preceding step into ellipses, e.g. by means of the Fitzgibbon 95 algorithm, described by Andrew W Fitzgibbon and Robert B Fisher in "A buyer's guide to conic fitting", Proceedings of the $6^{th}$ British Conference on Machine Vision (Vol. 2), pp. 513-522 (1995). This operation allows to numerically define the bubbles as easily-examinable geometric figures;

(j) for the purpose of eliminating from the image bubbles that are too small or too large, which are very probably false positives, eliminating the ellipses which have area less than a first threshold value of area, or greater than a second threshold value of area in order to retain only the significant ellipses;

(k) on the image obtained in the preceding step, selecting the pairs of ellipses perimetrically tangent or partially superimposed on each other, and joining said pairs of ellipses by using suitable geometric functions since very probably they derive from a single large bubble which the digital contour extraction filter erroneously broke in two, and (l) selecting ellipses that are overly long, e.g. with the ratio between the semimajor axis and the semiminor axis greater than 1.77, and dividing each selected ellipse into two or three smaller ellipses defined by two or three contour lines contained in the original contour line. This operation can be made for example by applying geometric functions.

At the end of the above-described steps (a) to (l) for digital processing of the digital primary image, a plurality of ellipses are identified in the processed image, which represent the contours of the respective plurality of bubbles highlighted on the surface of the frothed milk, in which each ellipse is defined by a plurality of geometric parameters, such as the semimajor axis and the semiminor axis.

The digital filters described in the present context are realized by means of mathematical algorithms suitable for image processing and implemented with commercial or custom software programs.

Although, in accordance with one embodiment, the air surface bubbles are described with the geometric shape of an ellipse, the present disclosure does not exclude that the bubbles can be geometrically described with a circle. In this case, the bubble is defined by one geometric parameter, the radius or diameter.

The process comprises, following the process step (l), the step of:

calculating a plurality of numerical parameters P relative to the plurality of bubbles identified on the processed final image of the milk surface.

Since a fine surface texture of the frothed milk usually contains few air bubbles with small radius or, in the case of very fine texture, the surface bubbles are nearly absent, the characterization of the size of the bubbles present in the surface and their density (number of bubbles per unit of area) and/or the number of bubbles allows the evaluation of the quality of the foam.

In some embodiments, the plurality of numerical parameters P calculated for the quantitative definition of the plurality of air bubbles comprise:

average radius $R_{ave}$ of the plurality of bubbles identified in the processed image calculated as average value of the average radii $(R_{ave})_i$ of the i-th bubble of the plurality of bubbles, in which $(R_{ave})_i$ of each bubble is the average value of the semimajor axis and of the semiminor axis of the ellipse that geometrically describes the contour of the bubble;

total density $D_T$ of the plurality of bubbles in the surface area inside the cup;

total number N of the plurality of bubbles;

density $D_G$ of "large" bubbles, i.e. the percentage of area of the free surface of the frothed milk which is occupied by bubbles which have an average radius greater than a given value (typically representative of a non-fine surface texture of the frothed milk), e.g. r>3.7 mm;

the density $D_M$ of "medium" bubbles, the percentage of area of the free surface of the frothed milk which is occupied by bubbles which have an average radius within a certain range of values, e.g. 1.87 mm≤r≤3.7 mm, and the density $D_P$ of "small" bubbles, i.e. the percentage of area of the free surface of the frothed milk which is occupied by bubbles which have an average radius less than a given value, e.g. r<1.87 mm.

In some embodiments, the numerical parameters P also comprise:

average minimum radius $R_{min}$ of the bubbles, and average maximum radius $R_{max}$ of the bubbles.

It is to be understood that the numerical parameters of interest can be a subset of the above-listed parameters and that the above-reported numerical values which define the bubbles of large, medium and small size are merely exemplifying. In one embodiment, a class is defined by a subset of numerical parameters, e.g. with number N of bubbles and the density $D_G$ of large bubbles. In another embodiment, a reference class is defined by only one numerical parameter, e.g. N.

For each numerical parameter, a plurality of numerical ranges is selected, as many as the number r of reference classes, and each numerical range is associated with a reference class, $Q_k$, with k=1, 2, . . . r, indicative of the quality of the foam.

The process proceeds with the association of each parameter value P calculated on the basis of the ellipses identified in the processed image with the numerical range which comprises such value and is associated with a specific reference class $Q_k$. In this manner, a reference class is associated with the numerical value of each parameter of the plurality of numerical parameters of the plurality of bubbles identified in the processed image. The association of each parameter P with a reference class can be executed by means of known software instruments.

In one embodiment, the numerical ranges which define a class $Q_k$ are empirically determined from the analysis of the sample frothed milk photograph associated with a respective reference class.

The Applicant has observed that: (a) numerical ranges of a specific numerical parameter P (e.g. $R_{ave}$, $D_G$, $D_M$, etc.) associated with the plurality of reference classes are not necessarily, for reasons of continuity and completeness, separated from and contiguous to each other and it can happen that a numerical value of a parameter P can belong to two ranges associated with respective, different reference classes, and (b) in the case of classification which uses a plurality of numerical parameters, different numerical parameters calculated on the same processed image, hence associated with the same dispensing operation, can be comprised in respective numerical ranges of different reference classes (e.g., $R_{ave}$ in class Q1, $D_G$ in class Q2, N in class Q1, etc.).

Preferably, the association of a numerical parameter with a reference class is represented by a numerical factor f, indicated hereinbelow with membership degree factor, defined by a positive real number comprised between a minimum value indicating that a numerical parameter does not fall within a numerical range of the plurality of numerical ranges of the reference class and a maximum value which represents the belonging of the numerical parameter within the range.

In some embodiments, a numerical value of each parameter P is associated with the factor f of membership degree to a numerical range for each reference class of the plurality of reference classes, in which f=1 if such value is comprised in that numerical range (including the ends of the range) and f=0 if it is outside such range.

Preferably, at least one third value of membership degree factor, f, is defined which represents the condition in which the parameter P is outside the range, but is positioned close thereto. In one embodiment, given a range of values [a,b] associated with a parameter P and with a class $Q_k$ of the plurality of reference classes, the numerical value of the parameter P is associated with a membership degree factor selected from among the following values:

f=1, if the numerical value is comprised in the range [a,b];

f=0.33, if does not lie within the range [a,b], but lies in a range extended 25% with respect to the range [a,b];

f=0.1, if does not lie within the range [a,b], but lies in a range extended 33% with respect to the range [a,b], and f=0, if it does not belong to the range [a,b] and not even in a ranged extended 33% with respect to the range [a,b].

By way of example, the parameter of the total number of bubbles identified on the surface of the frothed milk (in the digital processed image), N, is selected and it is assumed that the numerical range of the parameter N is [30,70] for the class $Q_k$=1 and [60,100] for the class $Q_{k+1}$=2. If, from the analysis of the processed image, 40 bubbles are identified on the surface of the frothed milk, N=40, the parameter N is assigned f=1 in the class $Q_k$=1 and f=0 in the class $Q_{k+1}$=2. If the value of the parameter is N=63, f=1 is associated in the class $Q_k$=1 and f=1 in the class $Q_{k+1}$=2. Assuming N=75, f=0.33 in the class $Q_k$=1, i.e. the number 75 is situated in the range of the class $Q_k$=1 when the values of both range ends are increased by 25%, i.e. extended range is [25,75], and f=1 in the class $Q_{k+1}$=2.

The assigning of membership degree factors to the plurality of classes is executed for each numerical parameter and for each class of the plurality of reference classes. At the end of the assigning procedure, each reference class is represented by a plurality of factors f associated with the respective numerical parameters which characterize the air bubbles in the foam.

In one embodiment, the membership degree of the plurality of numerical parameters relative to the bubbles to a reference class is defined by an index of membership to a class $Q_k$, $I_{Q,k}$, defined by the sum of the plurality of factors f associated with the respective plurality of numerical parameters.

The Applicant has observed that, in the plurality of numerical parameters relative to the air bubbles which describe the surface texture of the foam, some numerical parameters are more important for the definition of the quality of milk foam with respect to other parameters. The Applicant has realized that it is preferable to associate a weight factor to the value of each numerical parameter for each reference class of the plurality of reference classes $Q_1, \ldots, Q_r$, the weight factor indicating the probability that the milk foam of the digital processed image belongs to a reference class based on that specific numerical parameter. The weight factor, indicated hereinbelow with $w_j$, of a j-th parameter, is represented by real number ranging from 0 to 1.

In one embodiment, the weight factors associated with the radii of the bubbles are 0.05 and the weight factors associated with the number of bubbles and with the densities are equal to 0.25.

In the embodiments in which the numerical parameters are represented by membership degree factors, f, the process proceeds by assigning, to a reference class k, a class membership index indicated with $I_{Q,k}$, which is defined as sum of the membership degree factors of all the numerical parameters of the bubbles associated with that reference class, in which each factor $f_j$ is weighted by a weight factor $w_j$:

$$I_{Q,k} = \Sigma_1^m w_j \cdot f_j, \quad (1)$$

where m is the number of parameters and k=1, 2, ..., r, in which r is the number of the plurality of reference classes.

Since both $f_j$ are $w_j$ are positive real numbers, the membership index associated with a reference class $Q_k$ is a positive real number.

With reference to an above-described embodiment and in accordance with some embodiments, for each reference class, $Q_k$, a plurality of weight factors is defined which are associated with the respective plurality of reference parameters, which weigh the membership degree factors f: $w_1$, weight factor of $R_{ave}$, $w_2$ for the total density $D_T$ of bubbles, $w_3$ for the total number N of the plurality of bubbles, $w_4$ for the density $D_G$ of "large" bubbles, $w_5$ for the density $D_M$ of "medium" bubbles, $w_6$ for the density $D_P$ of "small" bubbles, $w_7$ for the average minimum radius $R_{min}$ of the bubbles, and $w_8$ for the average maximum radius $R_{max}$ of the bubbles. In this example, for each reference class of index k, $I_{Q,k} = \Sigma_1^8 w_j \cdot f_j$. For example, $w_1$=0.025, $w_2$=0.33, $w_3$=0.25, $w_4$=0.25, $w_5$=0.25, $w_6$=0.1, $w_7$=0.025 and $w_8$=0.025.

Preferably, after having determined the membership index to the k-th class, the process proceeds by normalizing the indexes $I_{Q,k}$, obtaining for each k-th class the corresponding normalized membership index $\tilde{I}_{Q,k}$ and selecting the class with highest normalized membership index $\tilde{I}_{Q,k}$.

In some preferred embodiments, the process comprises, once the highest normalized membership index $\tilde{I}_{Q,k}$ is selected, comparing such value with the normalized indexes $\tilde{I}_{Q,k+1}$ and $\tilde{I}_{Q,k-1}$ corresponding to the contiguous classes $Q_{k+1}$ and $Q_{k-1}$, checking if the differences $(\tilde{I}_{Q,k}-\tilde{I}_{Q,k-1})$ and $(\tilde{I}_{Q,k}-\tilde{I}_{Q,k+1})$ are greater than or less than or equal to a threshold difference value, for example equal to 0.5.

If the result of the checking is that both the differences $(\tilde{I}_{Q,k}-\tilde{I}_{Q,k-1})$ and $(\tilde{I}_{Q,k}-\tilde{I}_{Q,k+1})$ are greater than the threshold value, then the resulting class is $Q_k$.

If instead $(\tilde{I}_{Q,k}-\tilde{I}_{Q,k-1})$ or $(\tilde{I}_{Q,k}-\tilde{I}_{Q,k+1})$ is not greater than the threshold value, the process selects the contiguous class $Q_{k+1}$ or the contiguous class $Q_{k-1}$ depending on whether $\tilde{I}_{Q,k+1}$ is respectively greater or less than $\tilde{I}_{Q,k-1}$ and calculates the resulting class as final class, $Q_{fin}$, expressed by a positive real number comprised between the class $Q_{min}$ and $Q_{max}$ and determined by one of the following equations:

$$Q_{fin} = (Q_k \tilde{I}_{Q,k} + Q_{k+1} \tilde{I}_{Q,k+1})/(\tilde{I}_{Q,k} + \tilde{I}_{Q,k+1}) \quad (2)$$

if $\tilde{I}_{Q,k+1} > \tilde{I}_{Q,k-1}$, or $$Q_{fin} = (Q_k \tilde{I}_{Q,k} + Q_{k-1} \tilde{I}_{Q,k-1})/(\tilde{I}_{Q,k} + \tilde{I}_{Q,k-1}) \quad (3)$$

if $\tilde{I}_{Q,k+1} < \tilde{I}_{Q,k-1}$.

The value $Q_{fin}$ obtained from Equation (2) or from Equation (3) represents the resulting class, i.e. the result at the output.

Example

According to an example, a plurality of three reference classes, Q1, Q2 and Q3 are defined, the classes being indicative of the quality of the foam of a cappuccino, and two numerical parameters are taken as parameters associated with the bubbles identified and quantified in the processed image of the free surface of a cappuccino. The two parameters are the total density, $D_T$, of bubbles and the total number of bubbles, N. Table 1 provides exemplifying values of the membership degree factor f, of the total density, $f_{DT}$, and of the factor f of the total number of bubbles, $f_N$, for each class.

TABLE 1

| Class | $f_{DT}$ | $f_N$ |
|---|---|---|
| Q1 | 0 | 0.33 |
| Q2 | 1 | 0.33 |
| Q3 | 0.33 | 0 |

In this example, the factors f are not weighted by a weight factor ($w_j = 1$, $j = 1, \ldots, m$), therefore the Equation (1) becomes: $I_{Q,k} = \sum_1^m f_j$.

From the sum of the factors f of the parameters, the class membership indices are $I_{Q1} = 0.33$, $I_{Q2} = 1.33$ and $I_{Q3} = 0.33$. By normalizing such values in a manner such that $I_{Q1} + I_{Q2} + I_{Q3} = 1$, one obtains $(I_{Q1})n = 0.165$, $(I_{Q2})n = 0.665$ and $(I_{Q3})n = 0.165$. The cappuccino has 16.5% probability to be of class Q1, 66.5% to be of class Q2 and 16.5% to be of class Q3. The reference class is class Q2, which has a class index much greater than the class indices Q1 and Q3.

In case all the class indices are lower than a threshold value, it is not possible to establish any reference class and the process terminates by giving a message as a result, displayed on the display of the data terminal or of the dispensing machine, which indicates that the frothed milk of the cappuccino does not belong to any class.

If the difference between the highest class index and the class index contiguous to the first is less than a predetermined threshold value, for example 0.5, a linear combination is calculated based on the respective indices (Equation 2) and a real value is obtained that expresses the class of cappuccino with decimal numbers.

For example, if $I_{Q1} = 0.1$ (10%), $I_{Q2} = 0.4$ (40%) and $I_{Q3} = 0.2$ (20%), the class with the highest index is Q2, and of the classes contiguous thereto Q1 and Q3, Q3 has the higher index. The class representative of the quality of the cappuccino is a linear combination of $I_{Q2}$ and $I_{Q3}$, each weighted based on its respective score (in percentage values), $I = (40 \times 2 + 20 \times 3)/60 = 2.3$, which corresponds to the value of the reference class.

Preferably, each reference class is described by a class value, preferably represented by an integer, the plurality of classes being indicated by respective numerical values that range from a minimum value, $Q_{min}$, to a maximum reference class value, $Q_{max}$, the quality of the foam gradually improving from $Q_{min}$ to $Q_{max}$ (typically, $Q_{max}$ is associated with an optimal or desired foam surface texture). In the preferred embodiments, the process proceeds with checking if the class value $Q_k$ determined in the image of the dispensed beverage is different from the nominal class value Qn desired by a user or considered optimal for the machine. If $Qn = Q_{max}$, the process checks if $Q_k < Qn$.

Figure 8:
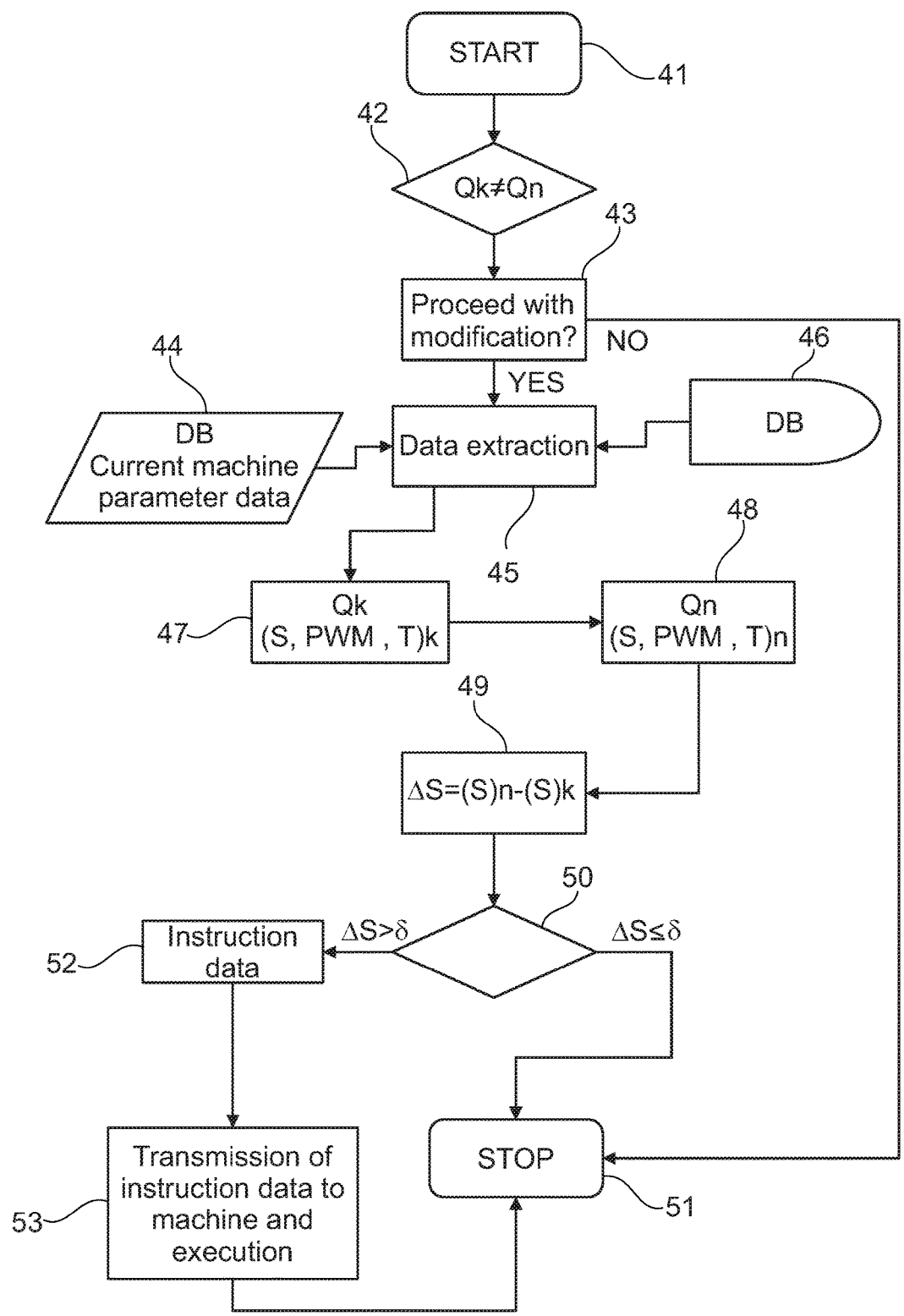
FIG. 8 is a flow diagram of the steps regarding the checking if a difference is present between the calculated reference class and a reference nominal class and the performing of the corrective actions, in accordance with one embodiment of the present disclosure.

FIG. 8 is a flow diagram of the steps regarding checking if a difference is present between the determined class value and, in case of a difference exceeding a predetermined threshold value, the application of the corrective actions, in accordance with one embodiment of the present disclosure. With reference to the embodiment of FIG. 3, the steps of determining the difference and of corrective actions can be executed by the corrective action module 25. In the method described in FIG. 8, the dispensing machine has a circuit for dispensing frothed milk which comprises a suction pump for sucking cold milk from a container and delivering milk along an outlet conduit, an inlet for the air connected with the suction conduit, on which a flow-control valve is arranged so as to allow variation of the incoming air flow, wherein the air inlet is connected with the suction conduit or with the outlet conduit so as to create an air-milk mixture from the dispensing outlet. The valve is a solenoid valve with adjustable flow rate for adjusting the incoming air and hence the amount of air introduced during the dispensing of a beverage. The adjustment of the air flow rate via the solenoid valve is electronically controlled by selecting a specific cross-sectional opening for flow, S, of the valve. The machine can for example comprise a hydraulic circuit for dispensing frothed milk, of the type shown in FIG. 6. The dispensing machine comprises a short-range radio communication module, such as a Wi-Fi module, for connecting to the server on which the server-side application runs for the automatic evaluation of the foam quality. The cycle of steps for checking a difference of the value $Q_k$ with respect to the value Qn and for executing corrective actions initiates (step 41) with the acquisition of the class value, $Q_k$, calculated on the basis of the analysis of the processed image. After the acquisition, the method checks (step 42) if the value $Q_k$ is different from the nominal class value Qn. If the checking produces a positive result, the server transmits a query to the data terminal (step 43), such query displayed on the display of the terminal, requesting confirmation if it is desired to proceed with the modification. If the user inserts a negative response to the question, the process terminates as indicated by the block 51.

If the user inserts a positive response to the question, the process continues and passes to step 45, in which the program retrieves the value (S)k of the flow section opening of the air flow-control valve associated with the class $Q_k$ from a database 46 which comprises at least one data table, preferably configured as a lookup table data structure, comprising a list of entries of air valve section opening values associated with a plurality of class values Q, from a minimum value (foam with little or no texture) to a maximum value (foam with very fine texture). The values of class Q comprise the values $Q_k$ and Qn.

Preferably, the program also retrieves a plurality of current machine operating parameters, i.e. in use during the dispensing operation, from a database 44, such as the value of the pump power (PWM)k and the temperature (T)k. As described above, the current machine operating parameters can be inserted by the user at the time of initialization of the application in the data terminal or can be automatically retrieved from the dispensing machine. Preferably, the data table of the database 46 comprises, as entries, other operating parameters of the machine such as the temperature of the milk (which in part depends on the quantity of milk and air in the air-milk mixture) and the pump working parameters so that the valve section opening values can be associated with any possible combination of input data and a corresponding configuration of output data.

FIG. 9 shows an example of a data table of the database 46, in which a plurality of lists of S values is reported for a respective plurality of reference classes Q from 1 to 6 and for a plurality of pump delivery values expressed as PWM percentage values in a variable speed rotary pump. In the example, the value S associated with a data class Q depends on the power of the variable flow pump and the relevant value S is extracted by retrieving the current operating data (PWM)k.

The values reported in the data table and their associations can be derived from empirical formulas and/or from test results on a machine having the same characteristics and functions as the dispensing machine under examination.

In some embodiments, the database 46 comprises a plurality of data tables, each data table being associated with a machine model. The user inserts the model of the dispensing machine or, if the machine is in communication with the server, the data extraction step 45 comprises retrieving the machine model, and, subsequently, the data extraction step 45 selects the table associated with that machine model.

In some embodiments, the data base 46 comprises a plurality of tables for each machine model, each table being associated with a work condition for the preparation of frothed milk, for example in accordance with the type of milk used, e.g. skim milk or whole milk. In this case, the extraction step 45 comprises retrieving information data indicative of the type of milk used for preparing the beverage and selecting the relevant data table according to the received information data.

After the extraction from the database 46 of the value (S)k corresponding to the class $Q_k$, and preferably of the values (PWM)k and (T)k from the database 44, the process extracts, from the data table in the database 46, a flow section opening value of the air valve, (S)n, associated with the nominal class Qn. It is to be understood that the extraction of the value (S)n from the data table can be executed before the extraction of the value (S)k.

In step 49, the process checks if a difference is present between the values of flow opening of the air valve corresponding to the different reference classes Qk and Qn, $\Delta S=(S)n-(S)k$. In block 50, the process determines if $|\Delta S|$ is smaller than or equal to a threshold value, $\delta$, or if it is greater than such threshold value. If $|\Delta S|\leq\delta$, the difference is deemed to be insignificant and the process is interrupted (block 51). The threshold value $\delta$ can for example be equal to 0.05 (5%). If $|\Delta S|>\delta$, the process continues to block 52, outputting instruction data which comprises the value of the difference $\Delta S$ for adjusting the opening of the air valve.

The instruction data is transmitted to the control unit of the machine which controls the automatic execution of an adjustment of the flow section opening of the valve in a manner so as to increase or decrease the current opening value by the amount $\Delta S$. The automatic adjustment comprises transmitting instructions for corrective actions in the form of electronic commands to the control unit of the machine and, upon reception of the instruction data, adjusting (by the control unit) the cross-sectional opening of the air valve so as to increase or decrease the current opening value by the amount $\Delta S$.

In one embodiment, after the transmission of instructions to the dispensing machine, the process returns to step 41 and repeats the dispensing with the new flow section opening value of the air valve and repeats the process from the acquisition of a new image to the calculation of a reference class Qk and the sequence of the steps of the process of FIG. 8.

Figure 10:
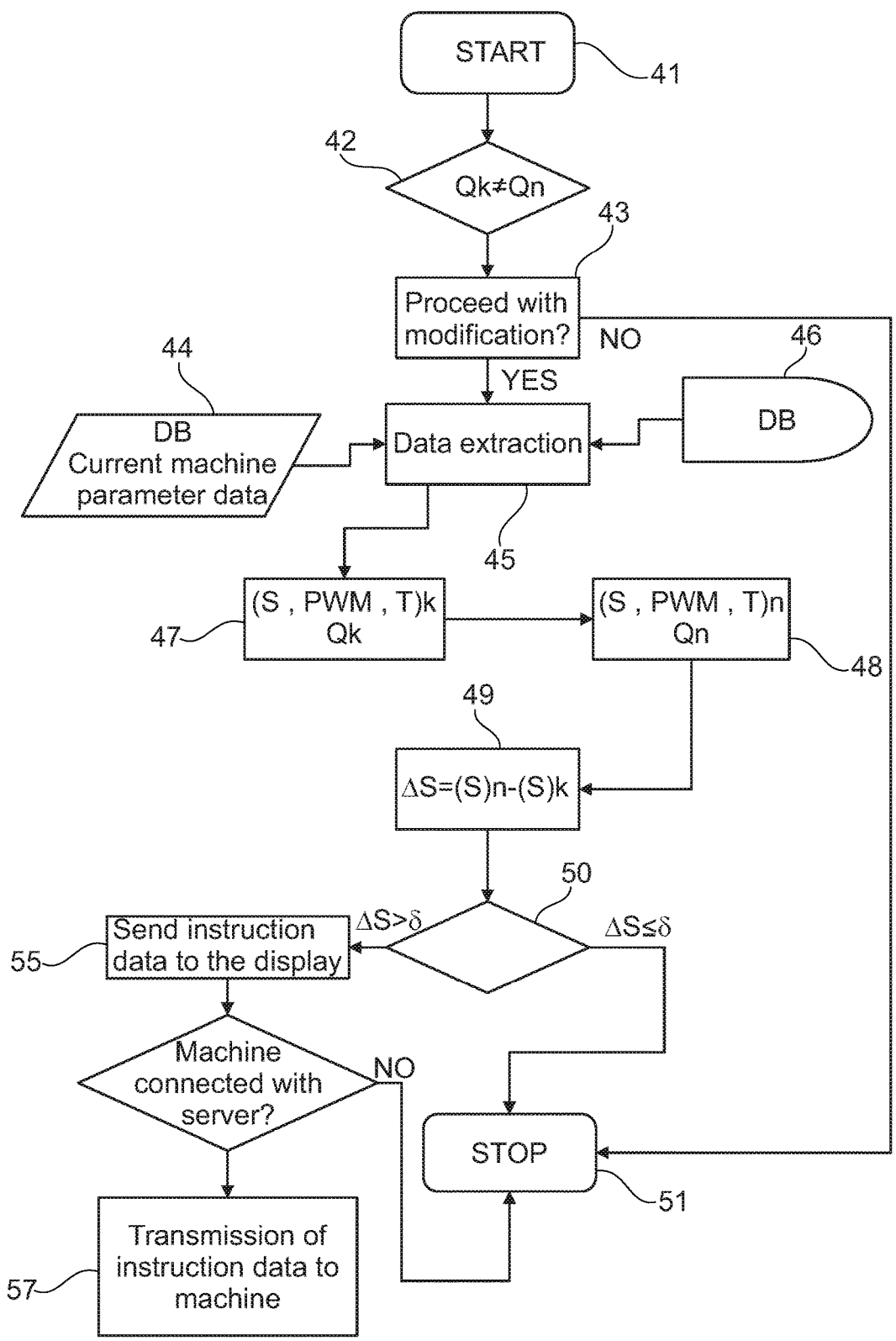
FIG. 10 is a flow diagram of the steps regarding the checking if a difference is present between the calculated reference class and a reference nominal class and the application of the corrective actions, in accordance with a further embodiment of the present disclosure.

FIG. 10 is a flow chart of the steps regarding checking if a difference is present between the determined class value and the nominal class value and the application of the corrective actions, in accordance with a further embodiment of the present disclosure. Reference numbers equal to those indicated for FIG. 8 indicate elements with equivalent functions. With respect to the process of FIG. 8, the process of FIG. 10 provides for the possibility that the dispensing machine does not comprise a module for connecting to the data terminal of the user or to a data communications network. In this embodiment, the server, in which the system for diagnosis and correction of the quality of the foam is implemented, is connected to the data terminal of the user, but it might not be connectable with the control unit of the dispensing machine. The process steps indicated with the blocks from 41 to 50 correspond to those described with reference to FIG. 8. If the result of step 50 is $|\Delta S|>\delta$, the process continues to block 55, outputting instruction data which comprises the opening value (S)n (and/or $\Delta S$) of the air valve, which is displayed, e.g. in a message form, on the data terminal display, for the use of the user. Subsequently, the process checks that the dispensing machine is connected to the server and hence that it can receive instruction data (block 56). If the checking gives a positive result, the instruction data is transmitted to the control unit of the machine which controls the automatic execution of an adjustment of the flow section opening of the valve in order to adjust the flow section opening value by a value $\Delta S$ (block 57), in a manner analogous to that described for the process of FIG. 8.

If the checking executed at the block 56 gives negative result, the process terminates as indicated by the block 51. In this case, the user, after having seen the message that indicates the adjustment of the machine parameters to be carried out (i.e. adjusting of the air valve), can operate on the machine, imparting a command that actuates the adjusting of the air valve, if the air valve is a solenoid valve controlled by the control unit, or manually adjusting the opening of the air valve, if the valve is a manually-adjustable flow calibrator.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of automatically assessing the quality of frothed milk foam in a milk-based beverage prepared by a dispensing machine, the method comprising:
   providing a beverage containing frothed milk within a container, the beverage having a free surface of frothed milk having a surface texture;

defining a plurality of reference classes representative of a foam quality level based on a surface texture of the frothed milk on the free surface, wherein the surface texture is described by air bubbles on the free surface, said classes being characterized by a plurality of numerical parameters comprising size and number of the plurality of bubbles, and wherein each reference class is described by a respective plurality of numerical ranges of the plurality of numerical parameters, a numerical range corresponding to a respective numerical parameter of the plurality of numerical parameters for each reference class, whereby each reference class is defined by a respective plurality of numerical ranges of the plurality of numerical parameters;

acquiring a digital image of the free surface of the beverage as a primary image;

digitally processing the acquired primary image to obtain a processed image of the free surface of the frothed milk, wherein a plurality of bubbles representative of the surface texture is identified in the processed image, each bubble being defined by a contour line that defines its size;

in the processed image, calculating a plurality of values of the corresponding plurality of numerical parameters which characterize the plurality of bubbles that have been identified in the processed image;

checking a membership of each numerical parameter value that has been calculated in the processed image to the plurality of numerical ranges of said numerical parameter, the numerical ranges being associated with their respective reference classes, and according to the result of the step of checking, assigning a current reference class of the plurality of reference classes, to thereby assign a reference class of foam quality to the acquired image of the beverage containing frothed milk.

2. The method as claimed in claim 1, wherein acquiring a primary image is carried out by a data terminal equipped with a camera and a display, the data terminal being connectable to a data communication network and the method comprises, after the step of acquiring, transmitting the primary image to a server via the data communication network, wherein the step of digitally processing the primary image and the following steps are carried out on the server.

3. The method as claimed in claim 2, which further comprises, after assigning a current reference class $Q_k$ to the acquired primary image, transmitting information data indicative of the current class $Q_k$ to the data terminal to display said information data on the data terminal display.

4. The method as claimed in claim 1, which further comprises:

defining a plurality of factors of degree of membership to a reference class as positive real numbers ranging from a minimum value indicating that a numerical parameter does not fall within a numerical range of the plurality of numerical ranges of the reference class, to a maximum value indicating that the numerical parameter falls within the range.

5. The method as claimed in claim 4, wherein checking the membership of each numerical parameter calculated in the processed image to the plurality of numerical ranges comprises:

assigning a membership degree factor of the plurality of membership degree factors to each numerical parameter of the plurality of numerical parameters characterizing the plurality of bubbles identified in the processed image, for each reference class, such that each reference class will be represented by a plurality of membership degree factors, which are as many as the plurality of the numerical parameters of the bubbles, and assigning a current reference class of the plurality of reference classes comprises summing up the plurality of membership degree factors for each reference class and selecting a current reference class of the plurality of reference classes which has the highest sum of the plurality of factors.

6. The method as claimed in claim 4, wherein checking the membership of each numerical parameter calculated in the processed image to the plurality of numerical ranges comprises:

assigning a membership degree factor of the plurality of membership degree factors to each numerical parameter of the plurality of numerical parameters characterizing the plurality of bubbles identified in the processed image, for each reference class, such that each reference class will be represented by a plurality of membership degree factors, which are as many as the plurality of the numerical parameters of the bubbles;

assigning a weight factor to each membership degree factor of a respective numerical parameter as a positive real number ranging from a minimum weight value to a maximum weight value and calculating a numerical membership index for each reference class of the plurality of classes as a sum of the plurality of membership degree factors of the corresponding plurality of numerical parameters associated with the reference class, wherein each membership degree factor is weighted by a respective weight factor, to thereby obtain a plurality of membership indexes associated with the corresponding plurality of reference classes, and assigning a current reference class of the plurality of reference classes comprises selecting the highest membership index from the plurality of membership indexes so calculated and assigning the reference class associated with the selected numerical index as the current reference class associated with the acquired image of the beverage containing frothed milk.

7. A method of automatically assessing the quality of milk foam dispensed by a frothed milk dispensing machine, the method comprising:

providing an automatic dispensing machine, for dispensing frothed milk from a dispensing outlet, which comprises a milk circuit comprising a plurality of circuit elements for which a respective plurality of machine operating parameters are set as current operating parameters, the plurality of machine operating parameters comprising a first machine operating parameter of a first circuit element;

dispensing a frothed milk-based beverage from the dispensing outlet, the beverage having a free surface of frothed milk having a surface texture, in which dispensing is carried out with the current machine operating parameters;

defining a plurality of reference classes representative of a foam quality level based on the surface texture of the frothed milk, wherein the surface texture is described by air bubbles on the free surface, said classes being characterized by a plurality of numerical parameters comprising the size and number of the plurality of bubbles on the free surface, and wherein each reference class is represented by a reference class value and is described by a respective plurality of numerical ranges of the plurality of numerical parameters, a numerical range corresponding to a numerical parameter of the plurality of numerical parameters for each reference class, whereby each reference class is defined by a respective plurality of numerical ranges of the plurality of numerical parameters;

acquiring a digital image as a primary image of the free surface of the beverage using a data terminal which comprises a camera and is connectable to a data communication network;

transmitting the acquired digital image to a computing device via the data communication network;

creating a database on the computing device, comprising at least one data table which comprises, as entries, a plurality of values of the first machine operating parameter, each value of the first machine operating parameter being associated to a respective reference class value;

digitally processing the acquired primary image on the computing device, to obtain a processed image, in which a plurality of bubbles representative of the surface texture of the beverage is identified, each bubble being defined by a contour line that defines its size;

in the processed image, calculating a plurality of values of the corresponding plurality of numerical parameters which characterize the plurality of bubbles;

checking a membership of each numerical parameter value that has been calculated in the processed image to the plurality of numerical ranges of said numerical parameter;

according to the result of the step of checking, assigning a current reference class, represented by reference class value $Q_k$ of the plurality of reference class values, to thereby assign a reference class of foam quality to the captured image of the beverage containing frothed milk.

8. The method as claimed in claim 7, wherein the method is for taking corrective actions and further comprises:

retrieving a nominal reference class value Qn of the plurality of reference class values and checking whether $Q_k$ differs from Qn by a value greater than a predetermined threshold value;

if the value $Q_k$ differs from the nominal class value Qn by a value greater than the predetermined threshold value, retrieving, from the database, a first value of the first machine operating parameter associated with the nominal class Qn and with the first circuit element and a second value of the first machine operating parameter associated with the current reference class value $Q_k$;

checking whether the first value of the first machine operating parameter associated with the current reference class differs from the second value of the first machine operating parameter, and if it does, outputting corrective action instruction data for adjusting the first current machine operating parameter according to the difference between the first and second values of the first machine operating parameter.

9. The method as claimed in claim 7, wherein the bubbles identified in the processed image are geometrically defined as ellipses and the numerical parameters comprise the number of the plurality of bubbles, an average radius of each bubble of the plurality of bubbles, and a plurality of density values of subgroups of the plurality of bubbles, wherein each subgroup is associated with a respective numerical range of the average radius of the bubbles.

10. The method as claimed in claim 8, wherein the dispensing machine comprises a module for transmitting and receiving network data, which is configured to be connected with the data communication network, and an electronic control unit connected with the data transceiver module and to the first circuit element for electronic control thereof, wherein outputting corrective action instruction data comprises:

transmitting the instruction data to the electronic control unit of the dispensing machine, and controlling the first circuit element executing the instruction data by automatically adjusting the first machine operating parameter by an amount equal to the difference between the first and the second values of the first machine operating parameter.

11. The method as claimed in claim 8, wherein the data terminal comprises a display, and the step of outputting corrective action instruction data comprises transmitting the instruction data to the data terminal for display of one or more instructions on a data terminal display.

12. The method as claimed in claim 7, which further comprises:

defining a plurality of factors of degree of membership to a reference class as positive real numbers which comprise a minimum value indicating that a numerical parameter does not fall within a numerical range of the plurality of numerical ranges of the reference class and a maximum value indicating the belonging of the numerical parameter to the numerical range, wherein checking the membership of each numerical parameter that has been calculated in the processed image to the plurality of numerical ranges comprises:

assigning a membership degree factor of the plurality of factors of degree of membership to each numerical parameter of the plurality of numerical parameters characterizing the plurality of bubbles identified in the processed image, for each reference class, such that each reference class will be represented by a plurality of membership degree factors, which are as many as the plurality of the numerical parameters of the bubbles;

assigning a weight factor to each degree of membership factor of a respective numerical parameter as a positive real number ranging from a minimum weight value to a maximum weight value and calculating a numerical membership index for each reference class of the plurality of classes as a sum of the plurality of membership degree factors of the corresponding plurality of numerical parameters associated with the reference class, wherein each membership degree factor is weighted by a respective weight factor, to thereby obtain a plurality of membership indexes associated with the corresponding plurality of reference classes, and wherein assigning a current reference class of the plurality of reference classes comprises selecting the highest membership index from the plurality of membership indexes so calculated and assigning the reference class associated with the selected numerical index as a current reference class associated with the captured image of the beverage containing frothed milk.

13. The method of claim 12, wherein assigning a current reference class of the plurality of reference classes comprises, before selecting the highest membership index, normalizing the plurality of membership indexes of the plurality of classes so as to obtain a plurality of normalized membership indexes, wherein the step of selecting the highest membership index is replaced by selecting the highest membership index $\tilde{I}_{Q,k}$ of the plurality of normalized membership indexes and comparing the highest normalized membership index with the normalized membership indexes $\tilde{I}_{Q,k+1}$ and $\tilde{I}_{Q,k-1}$ of the classes contiguous to the class associated with the highest normalized membership index, and wherein assigning a current reference class of the plurality of reference classes further comprises checking whether the respective differences between the highest membership index and each of the normalized membership indexes of the contiguous classes is greater than or less than-equal to a threshold difference value;

if both the differences between the highest membership index and each of the normalized membership indexes of the contiguous classes are greater than the threshold difference value, assigning to the highest normalized membership index the reference class associated with said highest index as current reference class associated with the acquired image of the beverage containing frothed milk; and if one between the differences between the highest normalized membership index and the normalized membership index of the contiguous class is less than or equal to the threshold difference value, calculating a final class value, $Q_{fin}$, according to one of the following equations $Q_{fin}=(Q_k \tilde{I}_{Q,k}+Q_{k+1} \cdot \tilde{I}_{Q,k+1})/(\tilde{I}_{Q,k}+\tilde{I}_{Q,k+1})$, if $\tilde{I}_{Q,k+1} > \tilde{I}_{Q,k-1}$, or $Q_{fin}=(Q_k \tilde{I}_{Q,k}+Q_{k-1} \cdot \tilde{I}_{Q,k-1})/(\tilde{I}_{Q,k}+\tilde{I}_{Q,k-1})$, if $\tilde{I}_{Q,k+1} < \tilde{I}_{Q,k-1}$, and assigning the calculated final class value $Q_{fin}$ to the reference class value $Q_k$ of the current reference class associated with the acquired image of the beverage containing frothed milk.

14. The method as claimed in claim 8, which further comprises, before the step of retrieving the nominal reference class value Qn, inputting, as input data for the data terminal, the nominal reference class value Qn, and transmitting the value Qn to the computing device.

15. The method as claimed in claim 7, wherein the plurality of circuit elements comprises a milk pump for sucking in milk from a milk container and an air conduit connected with the milk flow to produce a milk-air mixture that is dispensed from the dispensing outlet, the air conduit comprising an air inlet, and wherein air flow introduced through the air inlet is adjustable by adjusting a flow cross-sectional opening of a flow-control valve, the first circuit element being the air flow-control valve and the first machine operating parameter being the opening of the flow cross-section.

16. The method as claimed in claim 7, wherein the plurality of circuit elements comprises a milk pump for sucking in milk from a milk container and an air conduit connected with the milk flow to produce a milk-air mixture that is dispensed from the dispensing outlet, and wherein the milk pump has an output flow rate adjustable by controlling an operating power of the pump, the first circuit element being the milk pump and the first machine operating parameter being the operating power of the pump.

17. The method as claimed in claim 7, wherein the computing device is a remote server.

18. The method as claimed in claim 7, wherein the dispensing machine comprises a module for transmitting and receiving network data and the computing device is installed in the dispensing machine, the control unit being connected with the module for transmitting and receiving network data, said module being connectable with the data communication network.

19. The method as claimed in claim 7, wherein the acquired primary image is a photographic image.

* * * * *